United States Patent
Wu et al.

(10) Patent No.: US 7,474,458 B1
(45) Date of Patent: Jan. 6, 2009

(54) METHOD FOR PREPARING A POLED STRUCTURE WITH INHIBITION BLOCKS

(75) Inventors: Tso Lun Wu, Hsinchu (TW); Shang Ling Liu, Hsinchu (TW); Tze Chia Lin, Hsinchu (TW); Ming Hsien Chou, Hsinchu (TW)

(73) Assignee: HC Photonics Corp., Hsinchu (TW)

( * ) Notice: Subject to any disclaimer, the term of this patent is extended or adjusted under 35 U.S.C. 154(b) by 0 days.

(21) Appl. No.: 11/859,599

(22) Filed: Sep. 21, 2007

(51) Int. Cl.
*G02F 1/35* (2006.01)
*G02F 2/02* (2006.01)
(52) U.S. Cl. .......................... 359/326; 385/122; 372/22
(58) Field of Classification Search ......... 359/326–332; 385/122; 372/21, 22
See application file for complete search history.

(56) References Cited

U.S. PATENT DOCUMENTS

| | | | |
|---|---|---|---|
| 5,652,674 A * | 7/1997 | Mizuuchi et al. ............ | 359/326 |
| 6,002,515 A | 12/1999 | Mizuuchi et al. | |
| 6,353,495 B1 | 3/2002 | Mizuuchi et al. | |
| 6,654,529 B1 * | 11/2003 | Kawaguchi et al. ......... | 385/122 |
| 7,230,753 B2 * | 6/2007 | Mizuuchi et al. ............ | 359/321 |
| 2007/0053054 A1 * | 3/2007 | Kitamura et al. ............ | 359/326 |

* cited by examiner

*Primary Examiner*—Sung H Pak
*Assistant Examiner*—Daniel Petkovsek
(74) *Attorney, Agent, or Firm*—WPAT, Inc.; Anthony King (57) ABSTRACT

A method for preparing a poled structure comprises the steps of forming a ferroelectric substrate having a top surface and a bottom surface, performing a doping process to form at least one inhibition block in the ferroelectric substrate, forming an electrode structure including a first electrode and a second electrode on the top surface and a third electrode on the bottom surface and applying a predetermined voltage to the electrode structure to form a plurality of inverted domains outside of the inhibition block in the ferroelectric substrate. The ferroelectric substrate has a first polarization direction and a first crystal structure, the inhibition block has a second crystal structure different from the first crystal structure, and the inverted domains have a second polarization direction substantially opposite to the first polarization direction.

26 Claims, 13 Drawing Sheets

METHOD FOR PREPARING A POLED STRUCTURE WITH INHIBITION BLOCKS

BACKGROUND OF THE INVENTION (A) Field of the Invention

The present invention relates to a method for preparing a poled structure, and more particularly, to a method for preparing a poled structure with inhibition blocks to prevent the occurrence of over-poling.

(B) Description of the Related Art

The poled structure having poled domains in a ferroelectric single crystal such as lithium niobate ($LiNbO_3$), lithium tantalite ($LiTaO_3$) and potassium titanyl phosphate ($KTiOPO_4$) may be widely used in optical fields such as optical communications, optical storage and optical measurement. There are several methods for preparing the poled structure such as the proton-exchanging method, the electron beam-scanning method, the electric voltage applying method, etc.

U.S. Pat. No. 6,002,515 discloses a method for manufacturing a polarization inversion part on a ferroelectric crystal substrate. The polarization inversion part is prepared by steps of applying a voltage in the polarization direction of the ferroelectric crystal substrate to form a polarization inversion part, conducting a heat treatment for reducing an internal electric field generated in the substrate by the applied voltage, and then reinverting polarization in a part of the polarization inversion part by applying a reverse direction voltage against the voltage that was previously applied. In other words, the method for preparing a polarization inversion part disclosed in U.S. Pat. No. 6,002,515 requires performing the application of electric voltage twice.

U.S. Pat. No. 6,353,495 discloses a method for forming an optical waveguide element. The disclosed method forms a convex ridge portion having a concave portion on a ferroelectric single crystalline substrate, and a ferroelectric single crystalline film is then formed in the concave portion. A comb-shaped electrode and a uniform electrode are formed on a main surface of the ferroelectric single crystalline substrate, and electric voltage is applied to these two electrodes to form a ferroelectric domain-inverted structure in the film in the concave portion.

SUMMARY OF THE INVENTION

One aspect of the present invention provides a method for preparing a poled structure with inhibition blocks to prevent the occurrence of over-poling.

A method for preparing a poled structure according to this aspect of the present invention comprises the steps of forming a ferroelectric substrate having a top surface and a bottom surface, performing a doping process to form at least one inhibition block in the ferroelectric substrate, forming an electrode structure including a first electrode and a second electrode on the top surface and a third electrode on the bottom surface and applying a predetermined voltage to the electrode structure to form a plurality of inverted domains in the ferroelectric substrate outside of the inhibition block. The ferroelectric substrate has a first polarization direction and a first crystal structure, the inhibition block has a second crystal structure different from the first crystal structure, and the inverted domains have a second polarization direction substantially opposite to the first polarization direction.

BRIEF DESCRIPTION OF THE DRAWINGS

The objectives and advantages of the present invention will become apparent upon reading the following description and upon reference to the accompanying drawings in which.

DETAILED DESCRIPTION OF THE INVENTION

Figure 1:
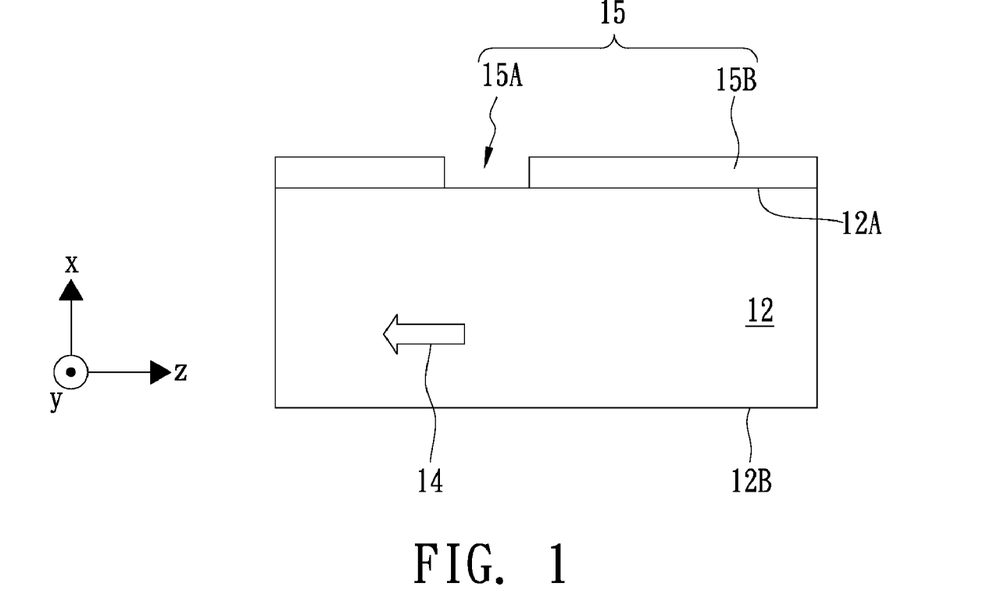
FIG. 1 to FIG. 9 illustrate a method for preparing a poled structure according to the first embodiment of the present invention.
Figure 2:
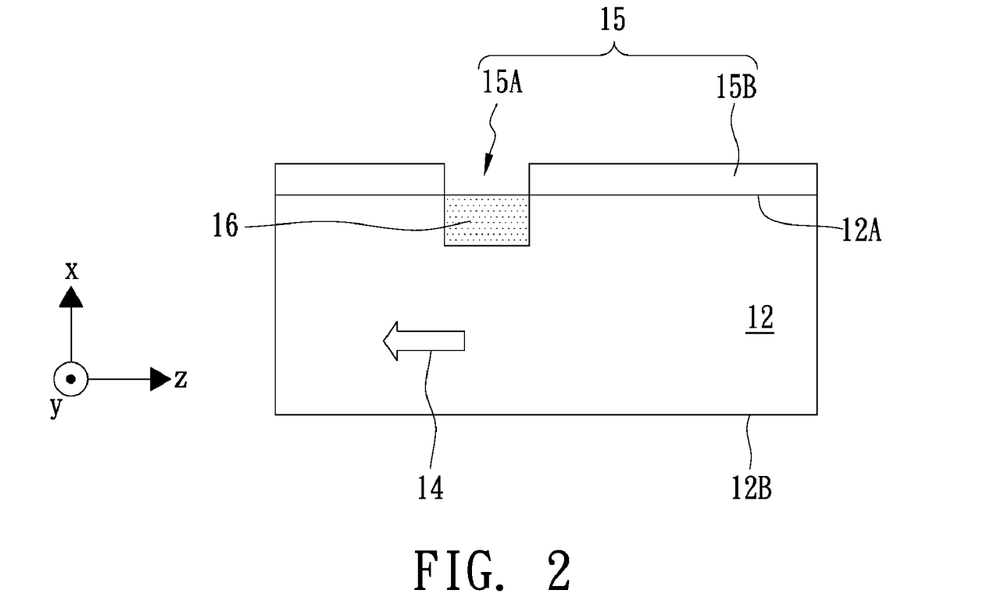

FIG. 1 to FIG. 9 illustrate a method for preparing a poled structure 10A according to the first embodiment of the present invention. The method first provides a ferroelectric substrate 12 with a first polarization direction 14 and a first crystal structure, and the ferroelectric substrate 12 has a top surface 12A and a bottom surface 12B. Subsequently, a mask 15 having at least one opening 15A and a pattern 15B is formed on the top surface 12A of the ferroelectric substrate 12, and a doping process is then performed to form at least one inhibition block 16 in an upper portion of the ferroelectric substrate 12, as shown in FIG. 2.

The doping process can be a proton-exchanging process performed by exposing the opening 15A to a fluid containing dopants such that the dopants diffuse into a portion of the ferroelectric substrate 12 through the opening 15A to form the inhibition block 16. In addition, the doping process can be an implanting process performed by implanting dopants into a portion of the ferroelectric substrate 12 through the opening 15A to form the inhibition block 16 under the opening 15A. In particular, the doping process changes the crystal structure of the ferroelectric substrate 12 such that the inhibition block 16 has a second crystal structure different from the first crystal structure.

Figure 3:
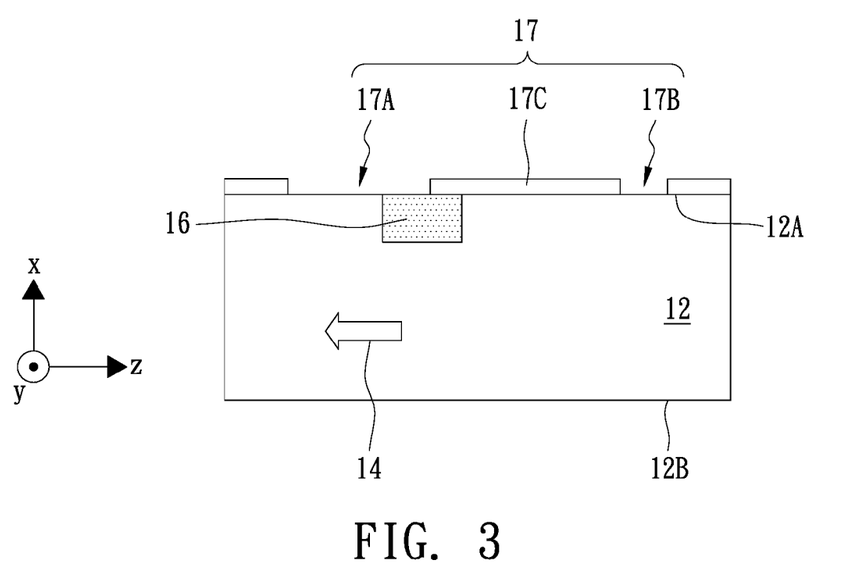
Figure 4:
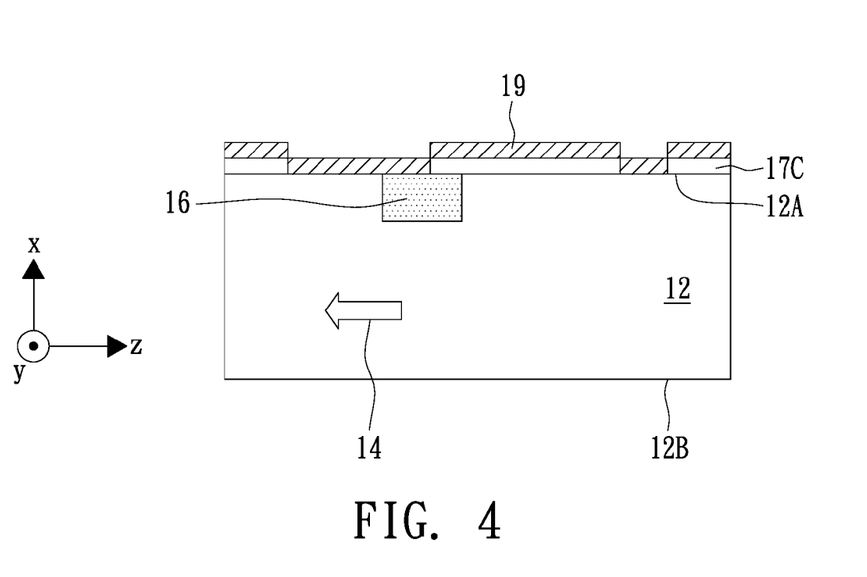

Referring to FIG. 3 and FIG. 4, the mask 15 is removed, and a mask 17 having a first opening 17A, a second opening 17B and a pattern 17C is formed on the top surface 12A of the ferroelectric substrate 12. A depositing process is then performed to form a metal layer 19 covering the first opening 17A, the second opening 17B and the pattern 17C, as shown in FIG. 4.

Figure 5:
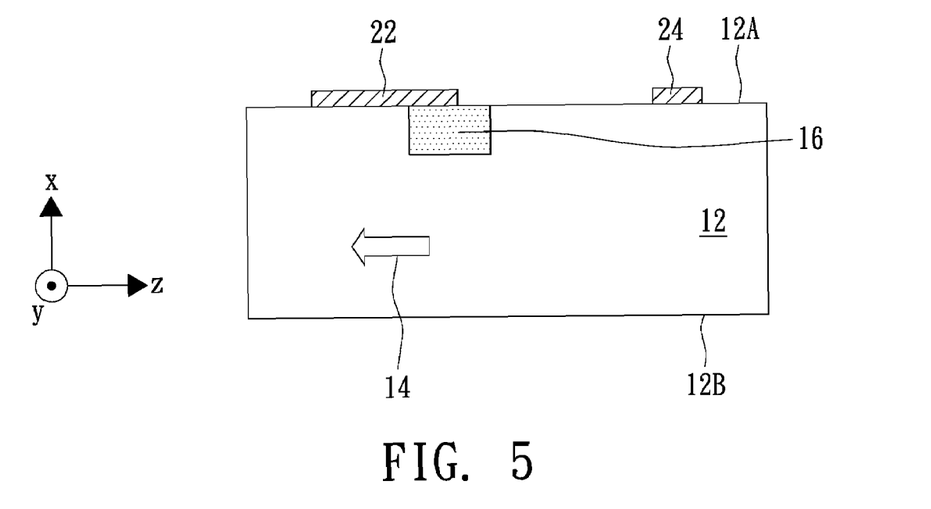
Figure 6:
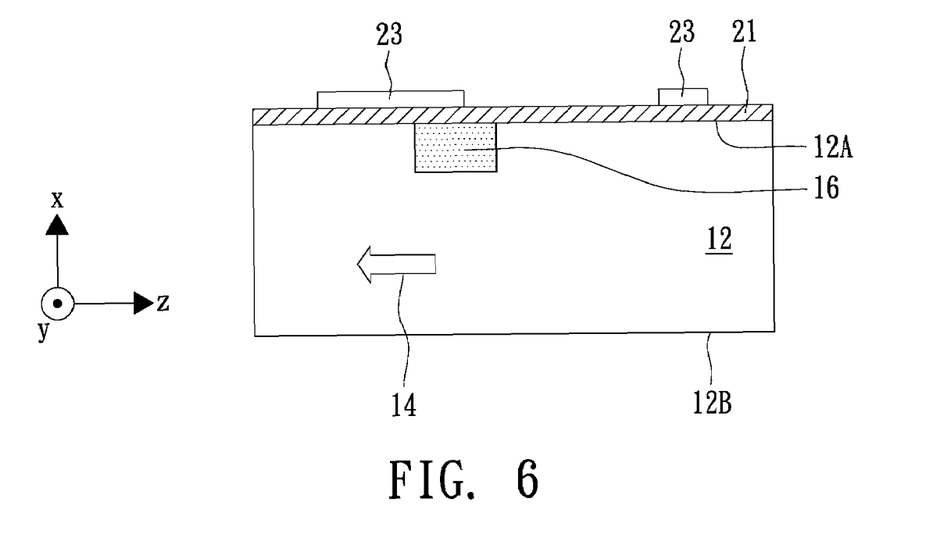
Figure 7:
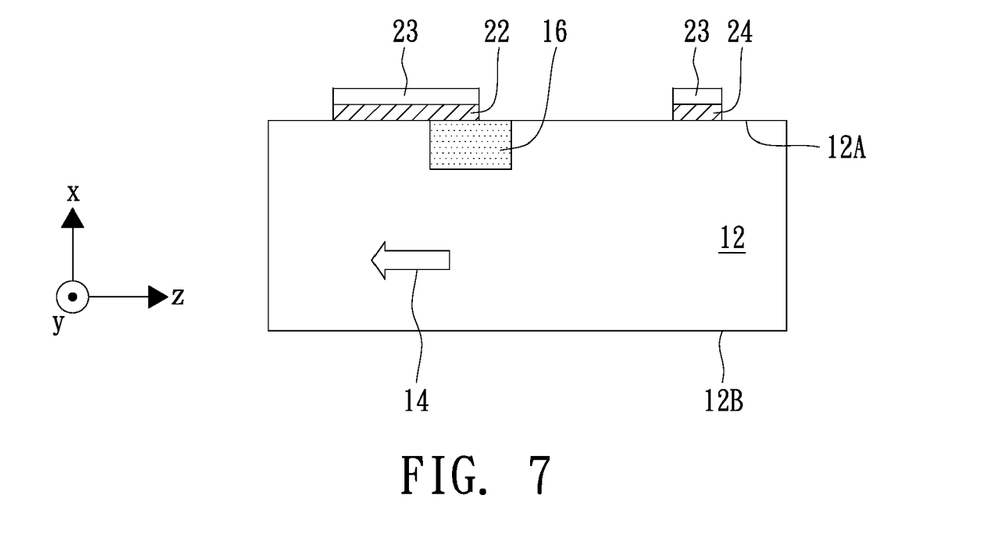

Referring to FIG. 5, the pattern 17C together with a portion of the metal layer 19 on the pattern 17C are removed from the ferroelectric substrate 12 to form a first electrode 22 and a second electrode 24 on the top surface 12A. Preferably, the pattern 17C is made of photoresist, and the pattern 17C together with the portion of the metal layer 19 on the pattern 17C is removed from the ferroelectric substrate 12 by a lift-off process. Alternatively, the first electrode 22 and the second electrode 24 may be formed on the top surface 12A by the steps of depositing a metal layer 21 covering the ferroelectric substrate 12, forming a pattern 23 covering a portion of the metal layer 21, and performing an etching process to remove a portion of the metal layer 21 not covered by the pattern 23, as shown in FIG. 6 and FIG. 7.

Figure 8:
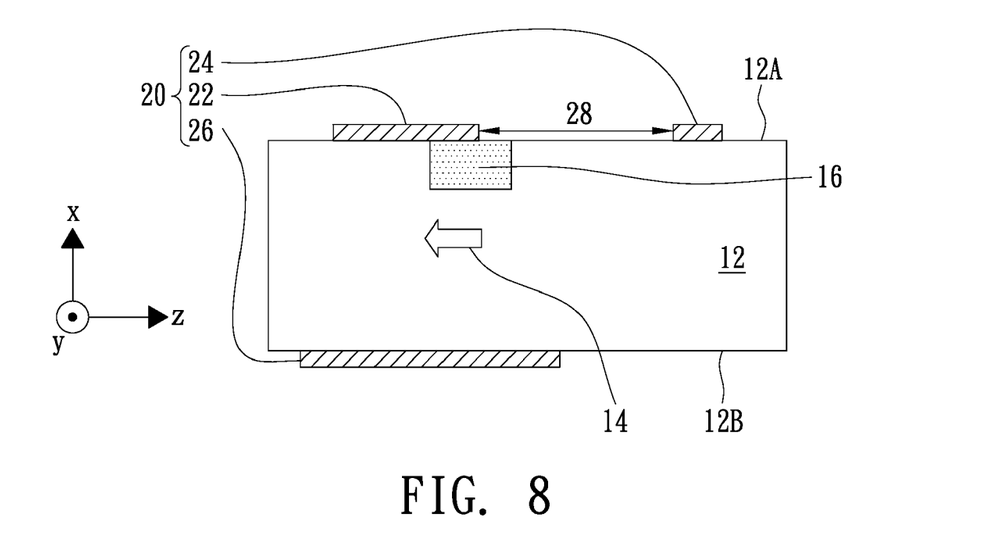

Referring to FIG. 8, similar to the processes shown in FIGS. 3-5 or FIGS. 6-7, a third electrode 26 can be formed on the bottom surface 12B of the ferroelectric substrate 12 to form an electrode structure 20, as shown in FIG. 8. In particular, the first electrode 22 is a positive electrode including a body 22A and a plurality of combs 22B, the second electrode 24 is a strip-shaped negative electrode, and the doping process forms the inhibition blocks 16 between the combs 22B of the first electrode 22. Furthermore, the first electrode 22 and the second electrode 24 are separated by a poling area 28, and the doping process preferably forms the inhibition blocks 16 covering a portion of the poling area 16 near the first electrode 22. Optionally, the ferroelectric substrate 12 may include a trench (not shown in the drawings) on the top surface 12A and the second electrode 24 may be formed in the trench.

Figure 9:
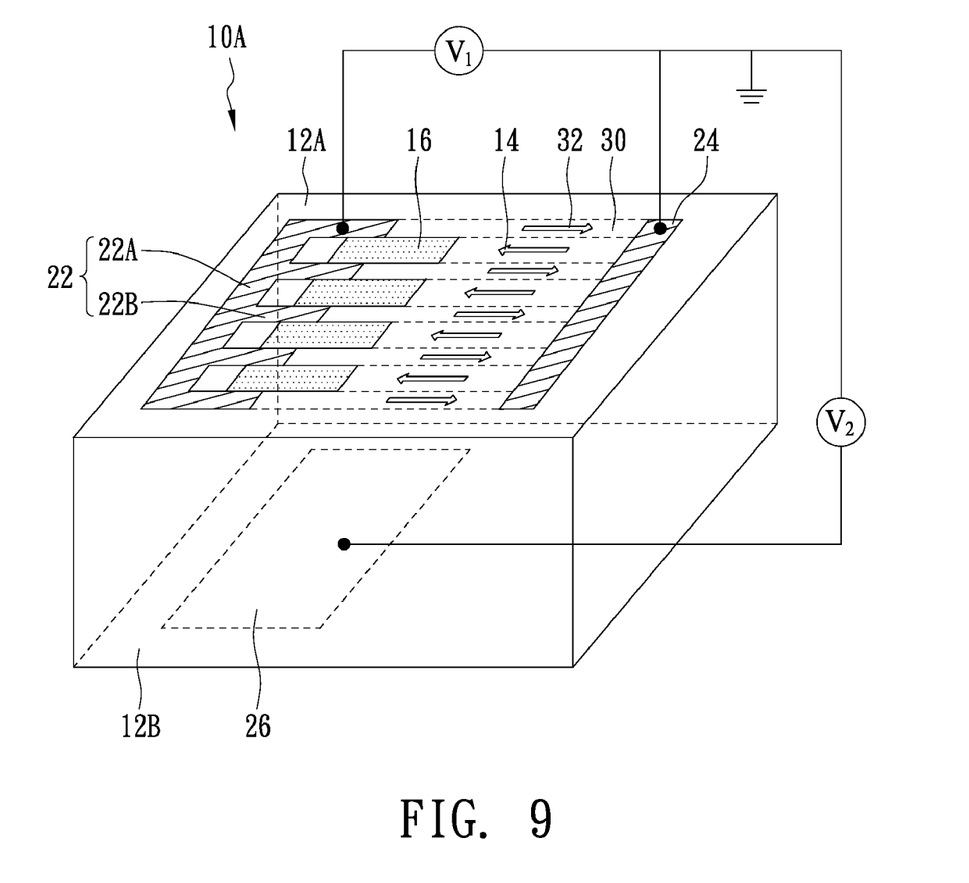

Referring to FIG. 9, a poling process is performed on the electrode structure 20 to form a plurality of inverted domains 30 outside of the inhibition block 16 in the ferroelectric substrate 12, and the inverted domains 30 have a second polarization direction 32 substantially opposite to the first polarization direction 14. Preferably, the poling process is performed by applying a first voltage to the first electrode 22, a second voltage to the second electrode 24 and a third voltage to the third electrode 26. Preferably, the first voltage is higher than the second voltage, the first voltage is higher than the third voltage, and the third voltage is higher than or equal to the second voltage.

In particular, the inhibition blocks 16 near the first electrode 22 can prevent the inverted domains 30 from merging in the ferroelectric substrate 12 between the first electrode 22 and the second electrode 24 such that uniform and deeper periodic inverted domains 30 can be prepared in the ferroelectric substrate 12. The purpose of the doping process is to change the original crystal structure of the ferroelectric substrate 12, whose polarization direction cannot be reversed by the subsequent poling process so that the enlarging of the inverted domains 30 due to over-poling can be inhibited.

Figure 10:
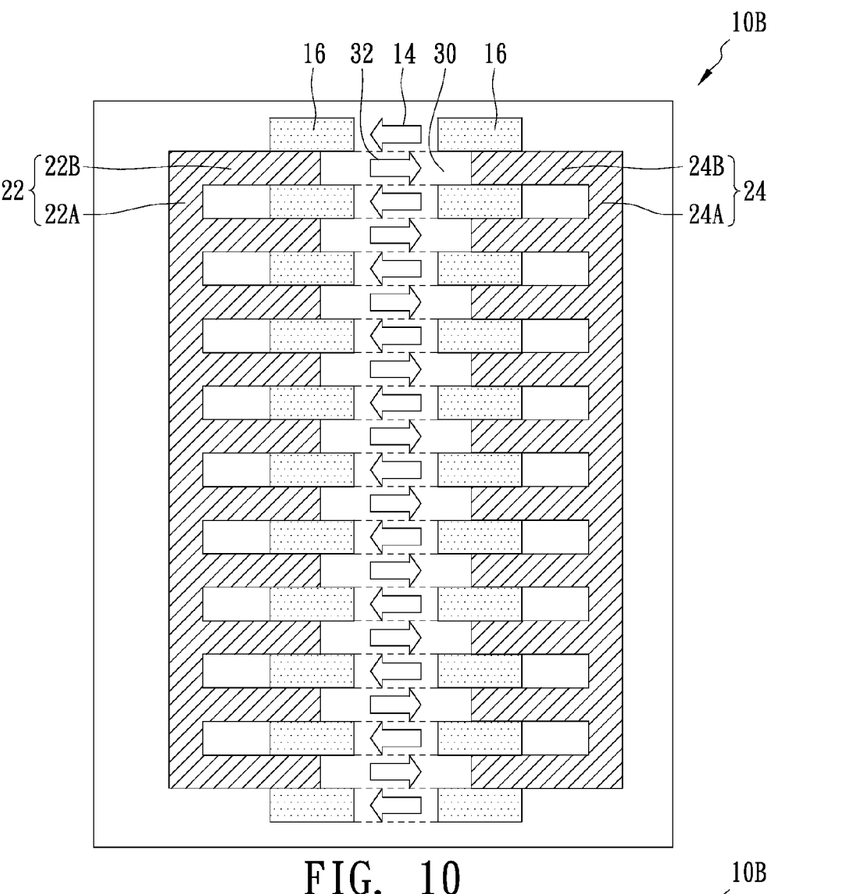
FIG. 10 and FIG. 11 illustrate a method for preparing a poled structure according to the second embodiment of the present invention.
Figure 11:
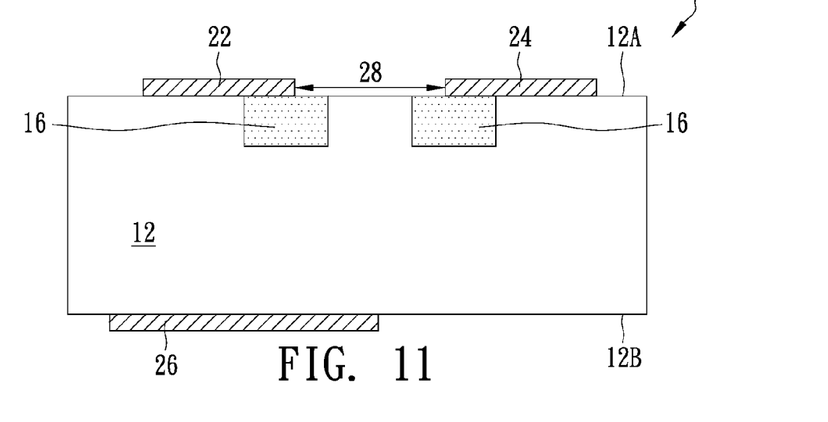

FIG. 10 and FIG. 11 illustrate a method for preparing a poled structure 10B according to the second embodiment of the present invention. FIG. 10 is a top view and FIG. 11 is a cross-sectional view of the poled structure 10B. Compared with the prepared poled structure 10A in FIG. 9, the first electrode 22 of the prepared poled structure 10B includes a plurality of combs 22B, the second electrode 24 includes a plurality of combs 24B, and the doping process forms a plurality of inhibition blocks 16 between the combs 22B of the first electrode 22 and between the combs 24B of the second electrode 24. In particular, the first electrode 22 and the second electrode 24 are separated by a poling area 28, and the doping process forms the inhibition blocks 16 covering a portion of the poling area 28. The inhibition blocks 16 between the combs 22B, 24B of the first electrode 22 and the second electrode 24 can prevent the inverted domain 30 from merging in the ferroelectric substrate 12 between the first electrode 22 and the second electrode 24 such that a uniformly deeper periodic inverted domain 30 can be prepared in the ferroelectric substrate 12.

Figure 12:
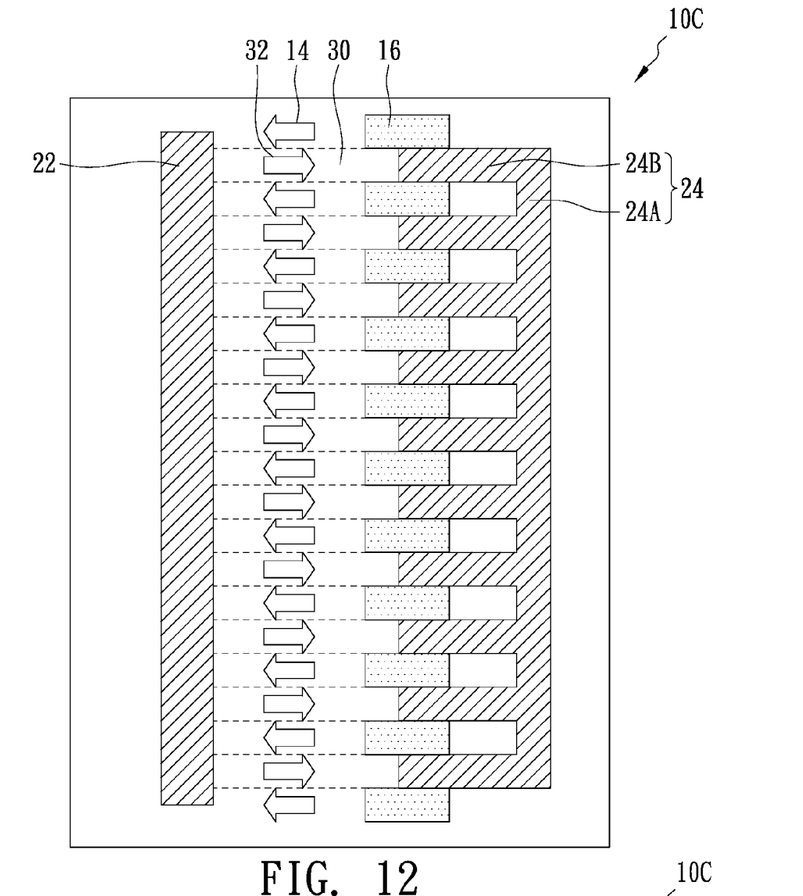
FIG. 12 and FIG. 13 illustrate a method for preparing a poled structure according to the third embodiment of the present invention.
Figure 13:
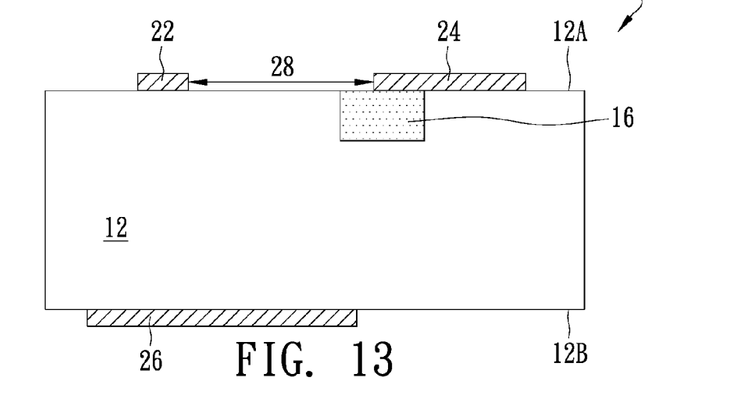

FIG. 12 and FIG. 13 illustrate a method for preparing a poled structure 10C according to the third embodiment of the present invention. FIG. 12 is a top view and FIG. 13 is a cross-sectional view of the poled structure 10C. Compared with the prepared poled structure 10A in FIG. 9, the first electrode 22 of the prepared poled structure 10C is a strip-shaped positive electrode, the second electrode 24 is a negative electrode including a plurality of combs 24B, and the doping process forms the inhibition blocks 16 between the combs 24B of the second electrode 24. In particular, the first electrode 22 and the second electrode 24 are separated by a poling area 28, and the doping process forms the inhibition blocks 16 covering a portion of the poling area 28. The inhibition blocks 16 between the combs 24B of the second electrode 24 can prevent the inverted domain 30 from merging in the ferroelectric substrate 12 between the first electrode 22 and the second electrode 24 such that a uniformly deeper periodic inverted domain 30 can be prepared in the ferroelectric substrate 12.

Figure 14:
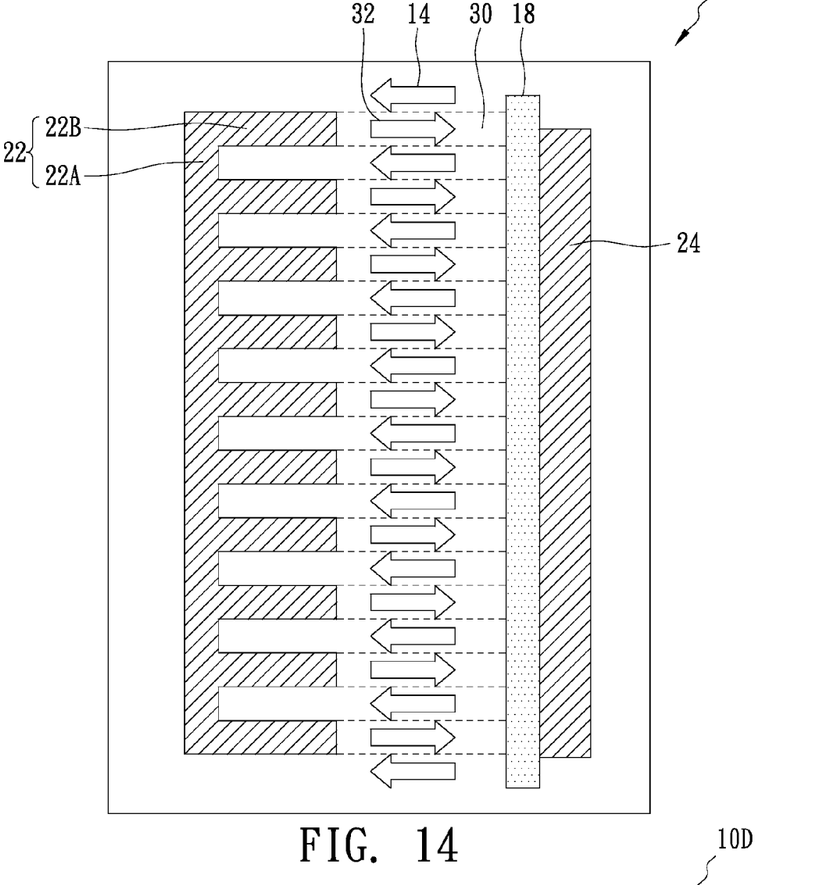
FIG. 14 and FIG. 15 illustrate a method for preparing a poled structure according to the fourth embodiment of the present invention.
Figure 15:
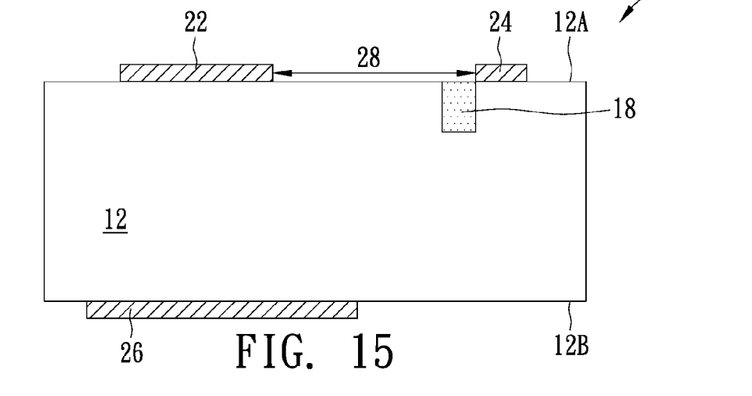

FIG. 14 and FIG. 15 illustrate a method for preparing a poled structure 10D according to the fourth embodiment of the present invention. FIG. 14 is a top view and FIG. 15 is a cross-sectional view of the poled structure 10D. Compared with the prepared poled structure 10A in FIG. 9, the first electrode 22 of the poled structure 10D is a positive electrode including a plurality of combs 22B, the second electrode 24 is a strip-shaped negative electrode, and the doping process forms a strip-shaped inhibition block 18 near the second electrode 24. Preferably, the first electrode 22 and the second electrode 24 are separated by a poling area 28, and the doping process forms the strip-shaped inhibition block 18 covering a portion of the poling area 28 near the second electrode 24. The strip-shaped inhibition block 18 in front of the strip-shaped negative electrode (the second electrode 24) can prevent the second electrode 24 from the occurrence of leakage when the inverted domains 30 extend to the strip-shaped negative electrode 24 from the positive electrode 22, since the doping process changes the crystal structure of the strip-shaped inhibition block 18, whose polarization is not easily reversed.

Figure 16:
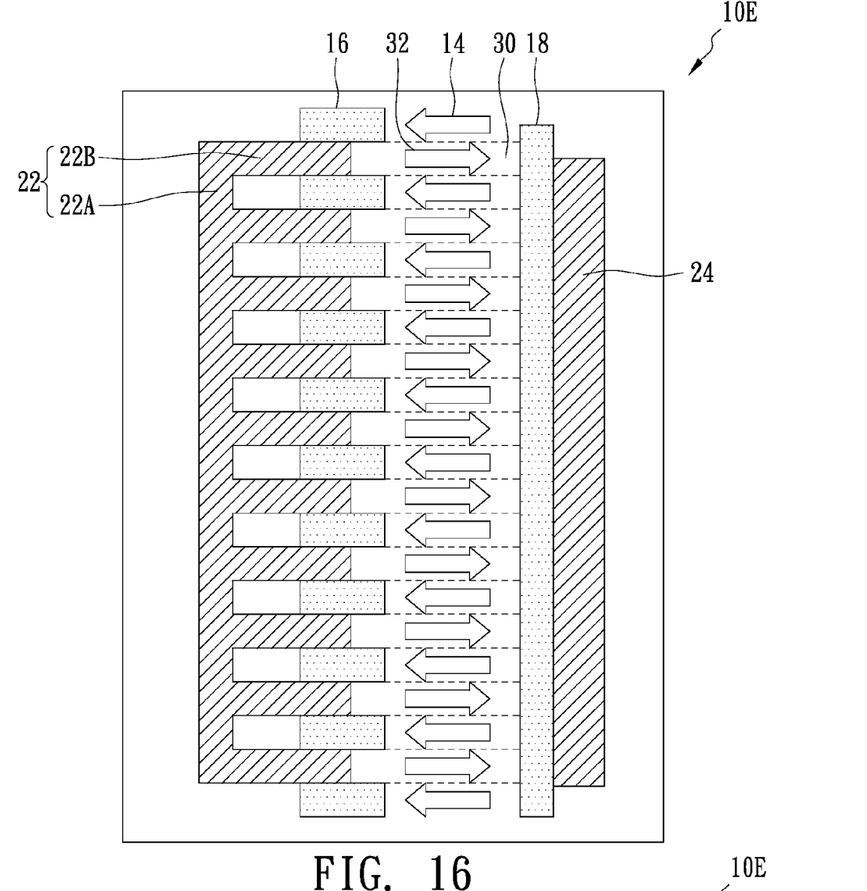
FIG. 16 and FIG. 17 illustrate a method for preparing a poled structure according to the fifth embodiment of the present invention.
Figure 17:
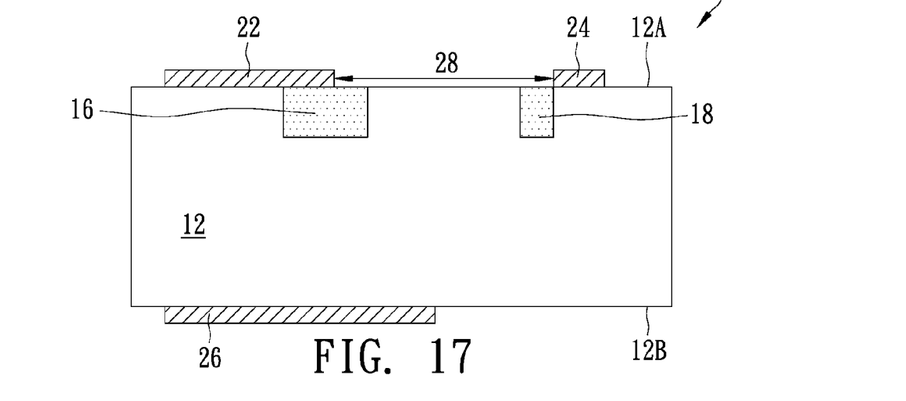

FIG. 16 and FIG. 17 illustrate a method for preparing a poled structure 10E according to the fifth embodiment of the present invention. FIG. 16 is a top view and FIG. 17 is a cross-sectional view of the poled structure 10E. Compared with the prepared poled structure 10A in FIG. 9, the first electrode 22 of the poled structure 10E is a positive electrode including a plurality of combs 22B, the second electrode 24 is a strip-shaped negative electrode, and the doping process forms a plurality of inhibition blocks 16 between the combs 22B and a strip-shaped inhibition block 18 near the second electrode 24. Preferably, the first electrode 22 and the second electrode 24 are separated by a poling area 28, and the doping process forms the inhibition blocks 16 covering a portion of the poling area near the first electrode 22 and the strip-shaped inhibition block 18 covering a portion of the poling area 28 near the second electrode 24. Due to the application of the inhibition blocks 16 and the strip-shaped inhibition block 18, this embodiment can not only inhibit over-poling but also prevent leakage, and the inverted domains 30 can be prepared more uniformly.

Figure 18:
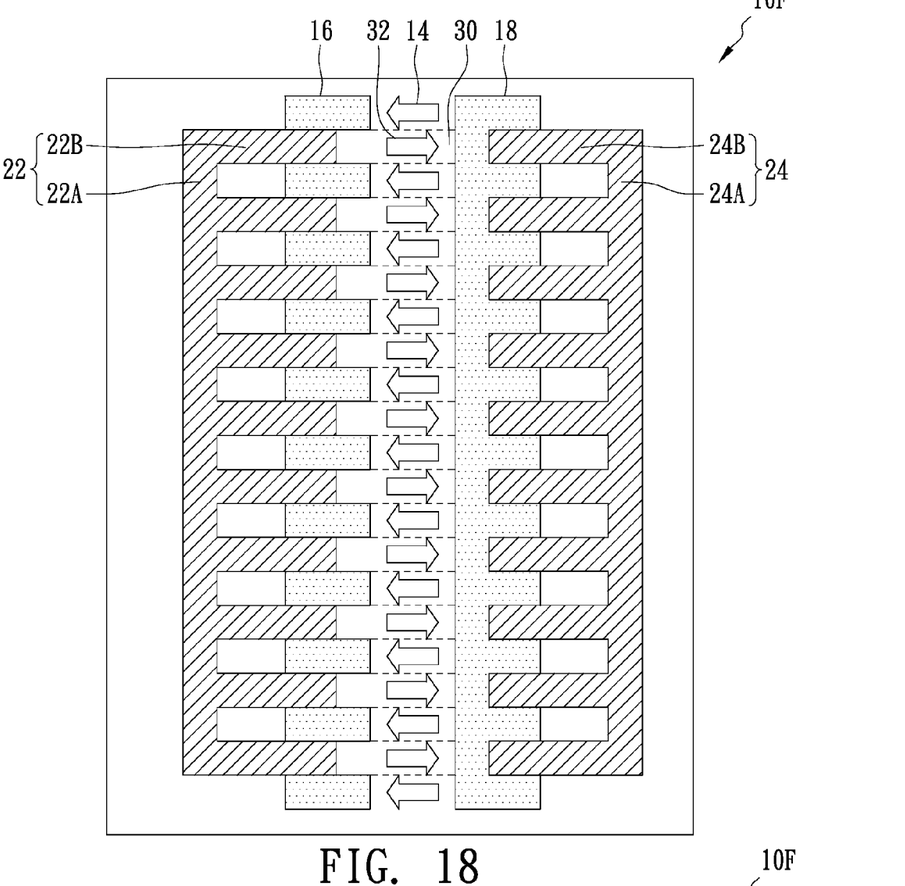
FIG. 18 and FIG. 19 illustrate a method for preparing a poled structure according to the sixth embodiment of the present invention.
Figure 19:
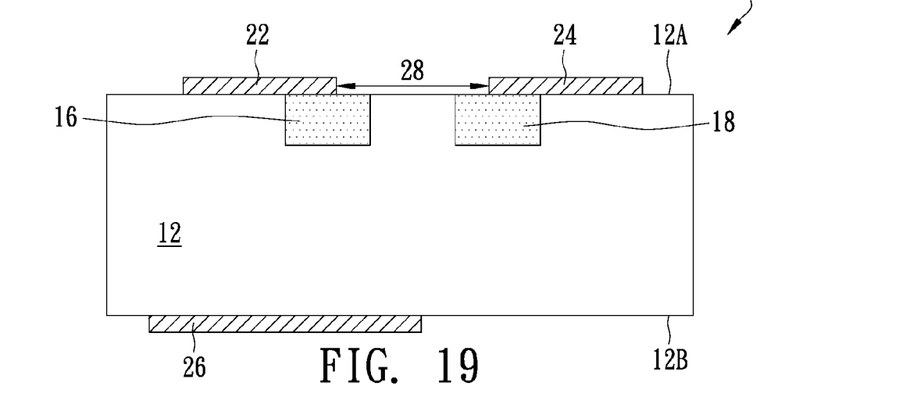

FIG. 18 and FIG. 19 illustrate a method for preparing a poled structure 10F according to the sixth embodiment of the present invention. FIG. 18 is a top view and FIG. 19 is a cross-sectional view of the poled structure 10F. Compared with the prepared poled structure 10A in FIG. 9, the first electrode 22 of the poled structure 10F includes a plurality of combs 22B, the second electrode 24 includes a plurality of combs 24B, and the doping process forms a plurality of inhibition blocks 16 between the combs 22B of the first electrode 22 and a strip-shaped inhibition block 18 near the second electrode 24. Preferably, the first electrode 22 and the second electrode 24 are separated by a poling area 28, and the doping process forms the inhibition blocks 16 covering a portion of the poling area 28 near the first electrode 22 and the strip-shaped inhibition block 18 covering a portion of the poling area 28 near the second electrode 24. Due to the application of the inhibition blocks 16 and the strip-shaped inhibition block 18, this embodiment can not only inhibit over-poling but also prevent leakage, and the inverted domains 30 can be prepared more uniformly.

Figure 20:
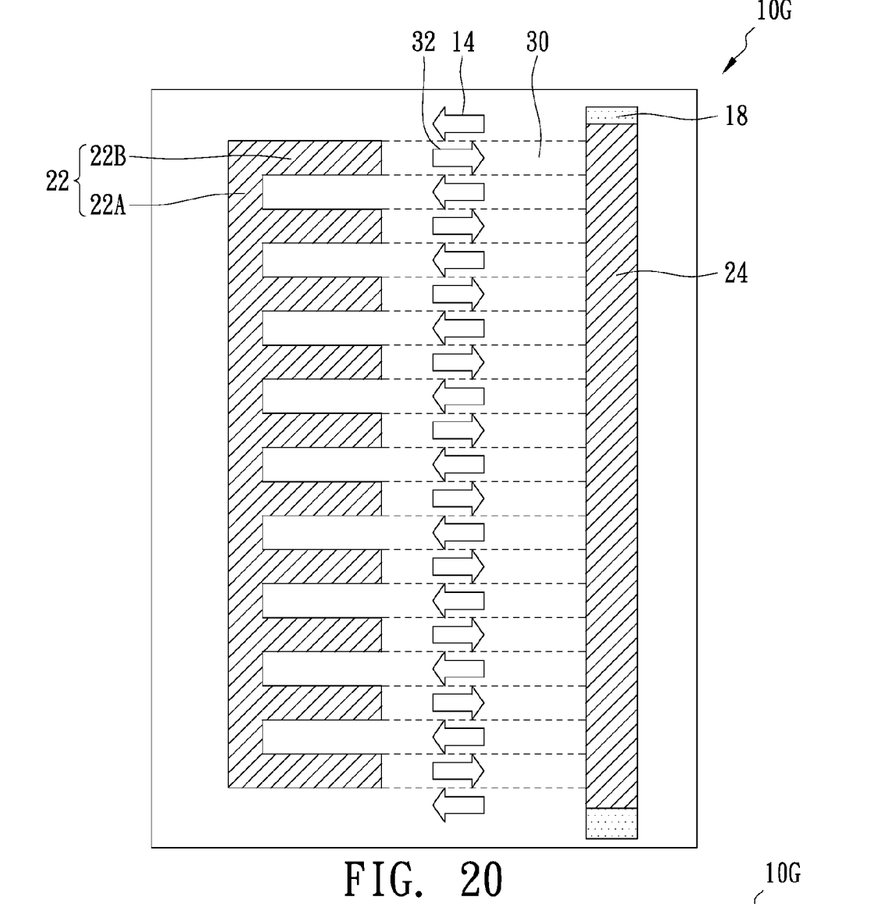
FIG. 20 and FIG. 21 illustrate a method for preparing a poled structure according to the seventh embodiment of the present invention.
Figure 21:
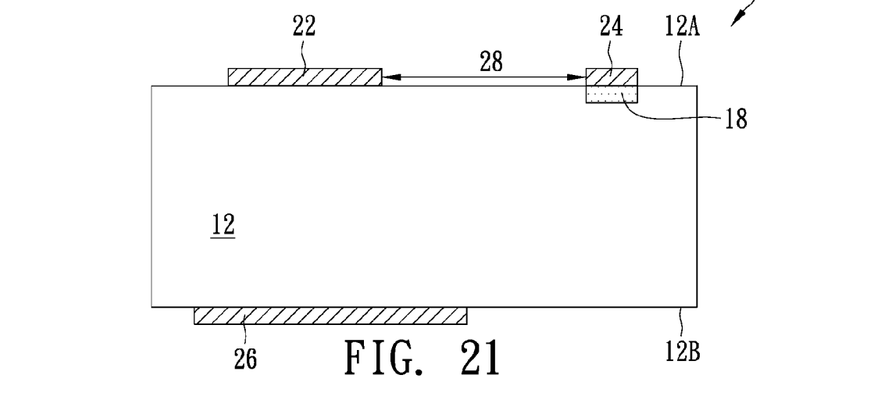

FIG. 20 and FIG. 21 illustrate a method for preparing a poled structure 10G according to the seventh embodiment of the present invention. FIG. 20 is a top view and FIG. 21 is a cross-sectional view of the poled structure 10G. Compared with the prepared poled structure 10A in FIG. 9, the first electrode 22 of the poled structure 10G includes a plurality of combs 22B, the doping process forms a strip-shaped inhibition block 18 in the ferroelectric substrate 12, and the second electrode 24 is formed on the strip-shaped inhibition block 18. In particular, the strip-shaped inhibition block 18 under the strip-shaped negative electrode 24 supports the conductivity and serves as the extension of the strip-shaped negative electrode 24, which can increase the internal electrical field as the poling process is performed by applying voltages to the positive electrode 22 and the negative electrode 24, and the increased internal electrical field is contributory to the formation of the inverted domains 30.

Figure 22:
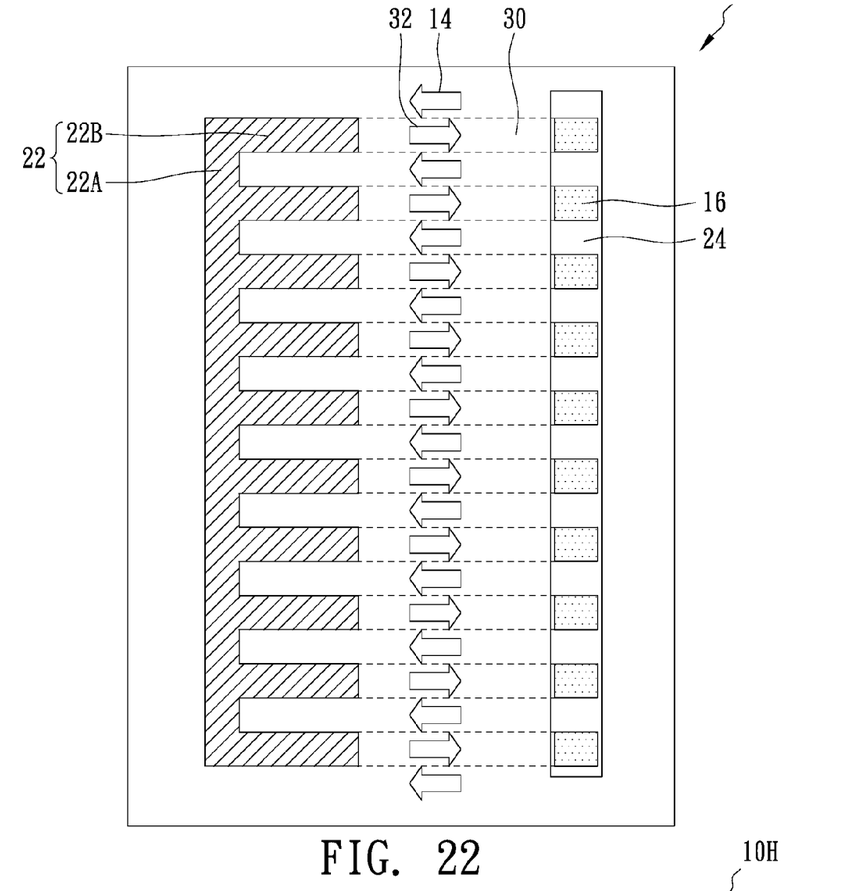
FIG. 22 and FIG. 23 illustrate a method for preparing a poled structure according to the eighth embodiment of the present invention.
Figure 23:
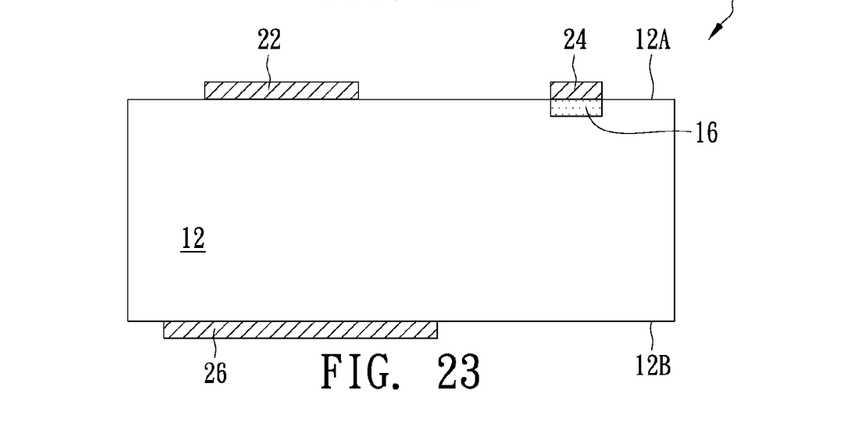

FIG. 22 and FIG. 23 illustrate a method for preparing a poled structure 10H according to the eighth embodiment of the present invention. FIG. 22 is a top view and FIG. 23 is a cross-sectional view of the poled structure 10H. Compared with the prepared poled structure 10A in FIG. 9, the first electrode 22 of the poled structure 10H includes a plurality of combs 22B, the doping process forms a plurality of inhibition blocks 16 in the ferroelectric substrate 12, and the second electrode 24 is formed on the inhibition blocks 16. In particular, the inhibition block 16 under the strip-shaped negative electrode 24 supports the conductivity and serves as the extension of the strip-shaped negative electrode 24, which can increase the internal electrical field as the poling process is performed by applying voltages to the positive electrode 22 and the negative electrode 24, and the increased internal electrical field is contributory to the formation of the inverted domains 30.

Figure 24:
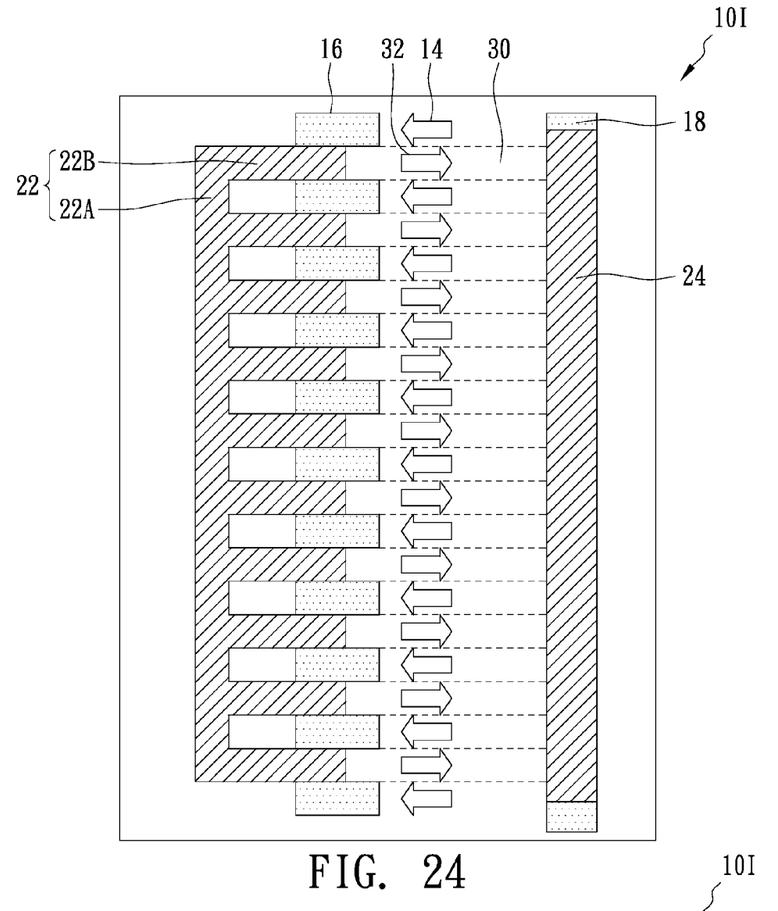
FIG. 24 and FIG. 25 illustrate a method for preparing a poled structure according to the ninth embodiment of the present invention.
Figure 25:
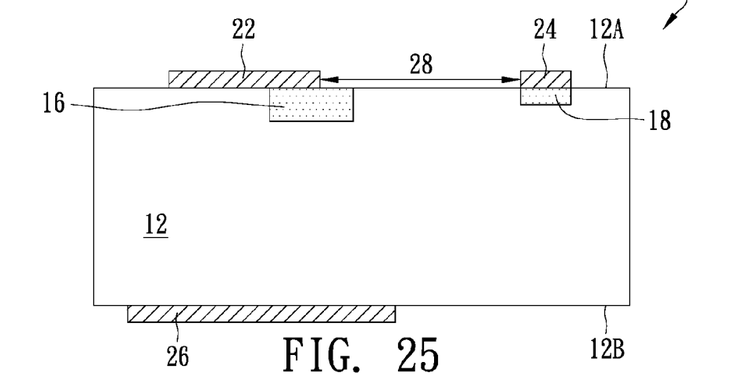

FIG. 24 and FIG. 25 illustrate a method for preparing a poled structure 10I according to the ninth embodiment of the present invention. FIG. 24 is a top view and FIG. 25 is a cross-sectional view of the poled structure 10I. Compared with the prepared poled structure 10A in FIG. 9, the first electrode 22 of the poled structure 10I includes a plurality of combs 22B, the doping process forms a plurality of inhibition blocks 16 between the combs 22B and a strip-shaped inhibition block 18 in the ferroelectric substrate 12, and the second electrode 24 is formed on the strip-shaped inhibition block 18. In particular, the strip-shaped inhibition blocks 16 between the combs 24B of the positive electrode 22 can inhibit over-poling and the strip-shaped inhibition block 18 under the negative electrode 24 can increase the internal field to help the formulation of inverted domains 30 uniformly.

The above-described embodiments of the present invention are intended to be illustrative only. Numerous alternative embodiments may be devised by those skilled in the art without departing from the scope of the following claims.

What is claimed is:

1. A method for preparing a poled structure, comprising the steps of:
    forming a ferroelectric substrate with a first polarization direction and a first crystal structure, and the ferroelectric substrate having a top surface and a bottom surface;
    performing a doping process to form at least one inhibition block positioned in the ferroelectric substrate, and the inhibition block having a second crystal structure different from the first crystal structure;
    forming an electrode structure including a first electrode and a second electrode on the top surface and a third electrode on the bottom surface; and
    performing a poling process by applying a first voltage to the first electrode, a second voltage to the second electrode, and a third voltage to the third electrode so as to form a plurality of inverted domains in a portion of the ferroelectric substrate outside the inhibition block, wherein the first voltage is higher than the second voltage, the third voltage is higher than the second voltage, and the inverted domain have a second polarization direction from the first electrode to the second electrode.

2. The method for preparing a poled structure as claimed in claim 1, wherein the doping process forms the inhibition block in an upper portion of the ferroelectric substrate.

3. The method for preparing a poled structure as claimed in claim 1, wherein the first electrode is a positive electrode including a plurality of combs, the second electrode is a strip-shaped negative electrode, and the doping process forms a plurality of inhibition blocks between the combs of the first electrode.

4. The method for preparing a poled structure as claimed in claim 3, wherein the first electrode and the second electrode are separated by a poling area, and the doping process forms the inhibition blocks covering a portion of the poling area near the first electrode.

5. The method for preparing a poled structure as claimed in claim 1, wherein the first electrode includes a plurality of combs, the second electrode includes a plurality of combs, and the doping process forms a plurality of inhibition blocks positioned between the combs.

6. The method for preparing a poled structure as claimed in claim 5, wherein the first electrode and the second electrode are separated by a poling area, and the doping process forms the inhibition blocks covering a portion of the poling area.

7. The method for preparing a poled structure as claimed in claim 1, wherein the first electrode is a strip-shaped positive electrode, the second electrode is a negative electrode including a plurality of combs, and the doping process forms a plurality of inhibition blocks between the combs of the second electrode.

8. The method for preparing a poled structure as claimed in claim 7, wherein the first electrode and the second electrode are separated by a poling area, and the doping process forms the inhibition blocks covering a portion of the poling area.

9. The method for preparing a poled structure as claimed in claim 1, wherein the first electrode is a positive electrode including a plurality of combs, the second electrode is a strip-shaped negative electrode, and the doping process forms the inhibition block near the second electrode.

10. The method for preparing a poled structure as claimed in claim 9, wherein the first electrode and the second electrode are separated by a poling area, the doping process forms the inhibition block covering a portion of the poling area near the second electrode, and the inhibition block is strip-shaped.

11. The method for preparing a poled structure as claimed in claim 1, wherein the first electrode is a positive electrode including a plurality of combs, the second electrode is a strip-shaped negative electrode, and the doping process forms a plurality of first inhibition blocks between the combs of the first electrode and a second inhibition block near the second electrode.

12. The method for preparing a poled structure as claimed in claim 11, wherein the first electrode and the second electrode are separated by a poling area, and the doping process forms the first inhibition blocks covering a portion of the poling area near the first electrode and the second inhibition block covering a portion of the poling area near the second electrode.

13. The method for preparing a poled structure as claimed in claim 1, wherein the first electrode includes a plurality of combs, the second electrode includes a plurality of combs, and the doping process forms a plurality of first inhibition blocks between the combs of the first electrode and a second inhibition block near the second electrode.

14. The method for preparing a poled structure as claimed in claim 13, wherein the first electrode and the second electrode are separated by a poling area, the doping process forms the first inhibition blocks covering a portion of the poling area near the first electrode and the second inhibition block covering a portion of the poling area near the second electrode, and the second inhibition block is strip-shaped.

15. The method for preparing a poled structure as claimed in claim 1, wherein the first electrode includes a plurality of combs, the doping process forms a strip-shaped inhibition block in the ferroelectric substrate, and the second electrode is a strip-shaped electrode formed on the strip-shaped inhibition block.

16. The method for preparing a poled structure as claimed in claim 1, wherein the first electrode includes a plurality of combs, the doping process forms a plurality of inhibition blocks in the ferroelectric substrate, and the second electrode is a strip-shaped electrode formed on the inhibition blocks.

17. The method for preparing a poled structure as claimed in claim 1, wherein the first electrode includes a plurality of combs, the doping process forms a plurality of first inhibition blocks between the combs and a second inhibition block in the ferroelectric substrate, and the second electrode is formed on the second inhibition block.

18. The method for preparing a poled structure as claimed in claim 1, further comprising a step of forming a trench on the top surface of the ferroelectric substrate and the second electrode being formed in the trench.

19. The method for preparing a poled structure as claimed in claim 1, wherein the second polarization direction is substantially opposite to the first polarization direction.

20. The method for preparing a poled structure as claimed in claim 1, wherein the doping process is a proton-exchanging process or an implanting process.

21. The method for preparing a poled structure as claimed in claim 1, wherein the doping process includes the steps of:
    forming a mask having at least one opening and a pattern on the top surface of the ferroelectric substrate; and
    exposing the opening to a fluid containing dopants such that the dopants diffuse into a portion of the ferroelectric substrate under the opening to form the inhibition block.

22. The method for preparing a poled structure as claimed in claim 1, wherein the doping process includes the steps of:
    forming a mask having at least one opening and a pattern on the top surface of the ferroelectric substrate; and
    performing an implanting process to implant dopants into a portion of the ferroelectric substrate under the opening to form the inhibition block.

23. The method for preparing a poled structure as claimed in claim 1, wherein the step of forming an electrode structure includes:
    forming a mask having at least one opening and a pattern on the ferroelectric substrate;
    depositing a metal layer covering the opening and the pattern; and
    removing the pattern and a portion of the metal layer on the pattern from the ferroelectric substrate.

24. The method for preparing a poled structure as claimed in claim 23, wherein the pattern is made of photoresist, and the pattern and the portion of the metal layer on the pattern are removed by a lift-off process.

25. The method for preparing a poled structure as claimed in claim 1, wherein the step of forming an electrode structure includes:
    depositing a metal layer on the ferroelectric substrate; and
    forming a pattern covering a portion of metal layer; and
    removing a portion of the metal layer not covered by the pattern.

26. The method for preparing a poled structure as claimed in claim 25, wherein the portion of the metal layer not covered by the pattern is removed by an etching process.

* * * * *